(12) United States Patent
Seol et al.

(10) Patent No.: US 12,548,825 B2
(45) Date of Patent: Feb. 10, 2026

(54) METHOD FOR FORMING POUCH (71) Applicant: LG Energy Solution, Ltd., Seoul (KR)

(72) Inventors: Dong Gyun Seol, Daejeon (KR); Yong Su Choi, Daejeon (KR); Sung Ryul Kwon, Daejeon (KR); Gi Beom Kang, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 196 days.

(21) Appl. No.: 18/279,656

(22) PCT Filed: Mar. 3, 2022

(86) PCT No.: PCT/KR2022/003040
§ 371 (c)(1),
(2) Date: Sep. 1, 2023

(87) PCT Pub. No.: WO2022/186639
PCT Pub. Date: Sep. 9, 2022

(65) Prior Publication Data
US 2024/0297377 A1    Sep. 5, 2024

(30) Foreign Application Priority Data

Mar. 4, 2021 (KR) .................. 10-2021-0029069

(51) Int. Cl.
*H01M 50/105* (2021.01)
*B29C 51/08* (2006.01)
(Continued)

(52) U.S. Cl.
CPC ......... *H01M 50/105* (2021.01); *B29C 51/082* (2013.01); *B29C 51/10* (2013.01);
(Continued)

(58) Field of Classification Search
CPC ....... B29C 51/082; B29C 51/10; B29C 51/14; B32B 7/12; B32B 15/085; B32B 15/088;
(Continued)

(56) References Cited

U.S. PATENT DOCUMENTS

| | | | |
|---|---|---|---|
| 11,450,911 B2 * | 9/2022 | Amano | ............... H01M 50/121 |
| 2009/0056981 A1 | 3/2009 | Maeda et al. | |

(Continued)

FOREIGN PATENT DOCUMENTS

| | | | |
|---|---|---|---|
| JP | 2002050326 A | 2/2002 | |
| JP | 2003187759 A | 7/2003 | |

(Continued)

OTHER PUBLICATIONS

Yoo (Machine translation of KR2018/009217) (Year: 2018).*

(Continued)

*Primary Examiner* — Michael A Tolin
*Assistant Examiner* — Hana C Page
(74) *Attorney, Agent, or Firm* — Lerner David LLP (57) ABSTRACT

The present invention relates to a method for forming a pouch, and the method for forming the pouch according to the present invention comprises: a curling process of bending a pouch sheet in a round shape; a seating process of seating the bent pouch sheet on a lower mold, in which a molding groove is formed; and a forming process of pressing the pouch sheet by using a punch mold to form an accommodation part, in which an electrode assembly is accommodated, in the pouch sheet.

6 Claims, 12 Drawing Sheets

(51) Int. Cl.
| | |
|---|---|
| *B29C 51/10* | (2006.01) |
| *B29C 51/14* | (2006.01) |
| *B32B 7/12* | (2006.01) |
| *B32B 15/085* | (2006.01) |
| *B32B 15/088* | (2006.01) |
| *B32B 15/20* | (2006.01) |
| *B32B 27/08* | (2006.01) |
| *B32B 27/32* | (2006.01) |
| *B32B 27/34* | (2006.01) |
| *B32B 27/36* | (2006.01) |
| *H01M 50/119* | (2021.01) |
| *H01M 50/121* | (2021.01) |
| *H01M 50/129* | (2021.01) |
| *B29K 23/00* | (2006.01) |
| *B29K 67/00* | (2006.01) |
| *B29K 77/00* | (2006.01) |
| *B29L 9/00* | (2006.01) |
| *B29L 31/00* | (2006.01) |

(52) U.S. Cl.
CPC ............... *B29C 51/14* (2013.01); *B32B 7/12* (2013.01); *B32B 15/085* (2013.01); *B32B 15/088* (2013.01); *B32B 15/20* (2013.01); *B32B 27/08* (2013.01); *B32B 27/32* (2013.01); *B32B 27/34* (2013.01); *B32B 27/36* (2013.01); *H01M 50/119* (2021.01); *H01M 50/121* (2021.01); *H01M 50/129* (2021.01); *B29K 2023/12* (2013.01); *B29K 2067/003* (2013.01); *B29K 2077/00* (2013.01); *B29L 2009/003* (2013.01); *B29L 2031/7146* (2013.01); *B32B 2439/02* (2013.01); *B32B 2457/10* (2013.01)

(58) Field of Classification Search
CPC ......... B32B 15/20; B32B 27/08; B32B 27/32; B32B 27/34; B32B 27/36; H01M 50/105
See application file for complete search history.

(56) References Cited

U.S. PATENT DOCUMENTS

| | | | |
|---|---|---|---|
| 2012/0183825 A1 | 7/2012 | Lee et al. | |
| 2016/0043354 A1 | 2/2016 | Han et al. | |
| 2017/0092912 A1 | 3/2017 | Shin et al. | |
| 2020/0044218 A1 | 2/2020 | Shin et al. | |
| 2020/0067029 A1 | 2/2020 | Park et al. | |
| 2022/0328871 A1* | 10/2022 | Numazawa | B32B 15/20 |

FOREIGN PATENT DOCUMENTS

| | | | |
|---|---|---|---|
| JP | 2006321220 | A | 11/2006 |
| JP | 2008216215 | A | 9/2008 |
| JP | 2015051525 | A | 3/2015 |
| KR | 20140015647 | A | 2/2014 |
| KR | 101415575 | B1 | 7/2014 |
| KR | 20160019230 | A | 2/2016 |
| KR | 20160115357 | A | 10/2016 |
| KR | 101816946 | B1 | 1/2018 |
| KR | 20180032043 | A | 3/2018 |
| KR | 20180062874 | A | 6/2018 |
| KR | 101889610 | B1 | 8/2018 |
| KR | 20180092174 | A | 8/2018 |
| KR | 101914563 | B1 | 11/2018 |
| KR | 20180118929 | A | 11/2018 |
| KR | 20190024755 | A | 3/2019 |
| KR | 20190059675 | A | 5/2019 |
| KR | 20200000966 | A | 1/2020 |
| KR | 102131739 | B1 | 7/2020 |

OTHER PUBLICATIONS

Yoo (Machine Translation of KR20180092174A) (Year: 2018).*
Oh (Machine Translation of KR101837234) (Year: 2018).*
Jung (Machine Translation of KR20190098581A) (Year: 2019).*
Noh (Machine translation of KR 101795711) (Year: 2017).*
Choi (Machine Translation of KR 101724620) (Year: 2017).*
Extended European Search Report including Written Opinion for Application No. 22763620.6 dated Mar. 28, 2025. 6 pages.
International Search Report for PCT/KR2022/003040 mailed Jun. 13, 2022. 3 pages.

* cited by examiner

METHOD FOR FORMING POUCH

CROSS-REFERENCE TO RELATED APPLICATIONS

This application is a national phase entry under 35 U.S.C. § 371 of International Application No. PCT/KR2022/003040, filed on Mar. 3, 2022, which claims priority to Korean Patent Application No. 10-2021-0029069, filed on Mar. 4, 2021, the entire contents of which are hereby incorporated by reference herein in their entireties.

TECHNICAL FIELD

The present invention relates to a method for forming a pouch.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, small weight, easy shape deformation, and the like, and thus, its usage is gradually increasing.

However, there is a problem in that a process of forming an accommodation part in a pouch sheet that accommodates an electrode assembly so as to manufacture a secondary battery is performed to cause curls such as being wound in a circular shape due to a difference in elongation rate between layers in a pouch constituted by the plurality of layers, thereby causing an interference between assembly mechanisms. Also, vacuum adsorption is not performed during the transferring, resulting in a problem that an operation of the equipment is stopped. In addition, there is a problem in that costs for remodeling the equipment to prevent the curls from occurring increase, and in particular, the remodeling of the equipment is not easy in a high-speed production line.

DISCLOSURE OF THE INVENTION

Technical Problem

One aspect of the present invention is to provide a method for forming a pouch, which is capable of preventing or remarkably reducing an occurrence of curls in a process of forming an accommodation part that accommodates an electrode assembly in a pouch sheet.

Technical Solution

A method for forming a pouch according to the present invention may comprise: a curling process of bending a pouch sheet in a round shape; a seating process of seating the bent pouch sheet on a lower mold, in which a molding groove is formed; and a forming process of pressing the pouch sheet by using a punch mold to form an accommodation part, in which an electrode assembly is accommodated, in the pouch sheet.

A pouch according to an embodiment of the present invention may be manufactured through the method for forming the pouch according to an embodiment of the present invention.

A secondary battery according to an embodiment of the present invention may comprise the pouch manufactured through the method for forming the pouch according to an embodiment of the present invention.

Advantageous Effects

According to the present invention, since the accommodation groove accommodating the electrode assembly is formed in the pouch sheet after bending the pouch sheet in the round shape, the occurrence of the curls in the pouch may be significantly reduced or prevented.

MODE FOR CARRYING OUT THE INVENTION

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Method for Forming Pouch According to Embodiment

Figure 1:
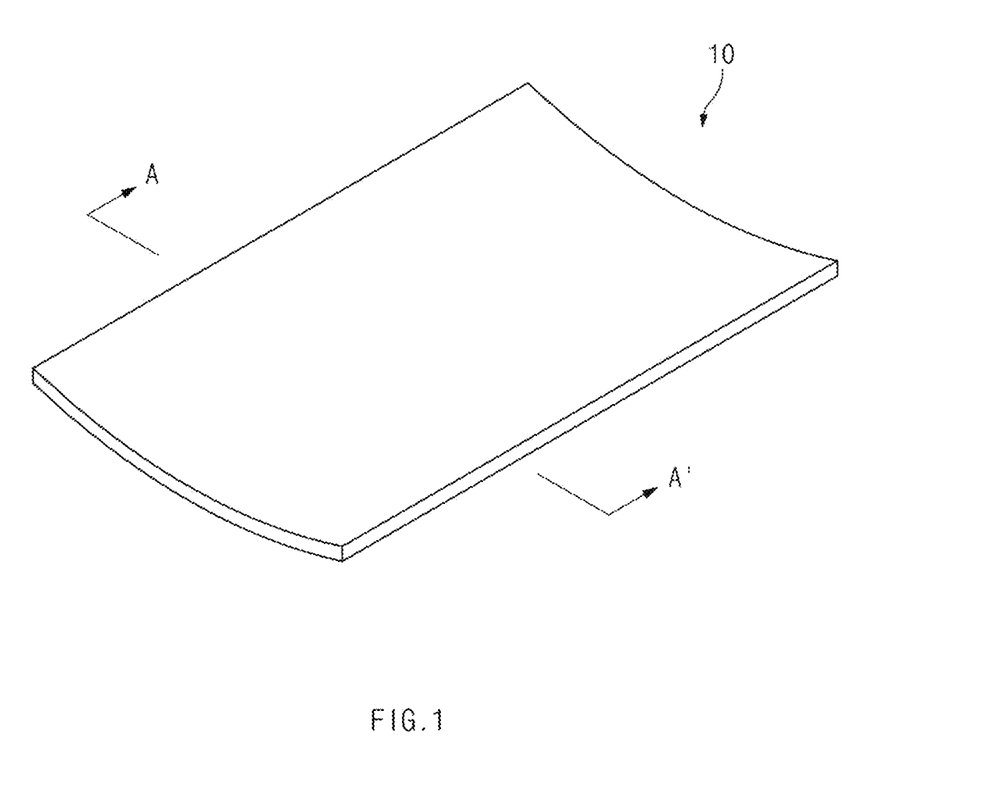
FIG. 1 is a perspective view illustrating a curling process in a method for forming a pouch according to an embodiment of the present invention.
Figure 2:
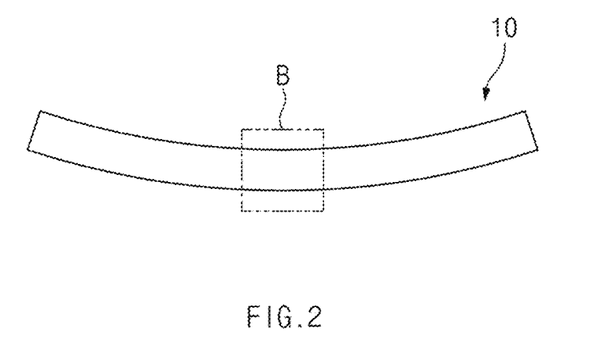
FIG. 2 is a cross-sectional view taken along line A-A' of FIG. 1.
Figure 3:
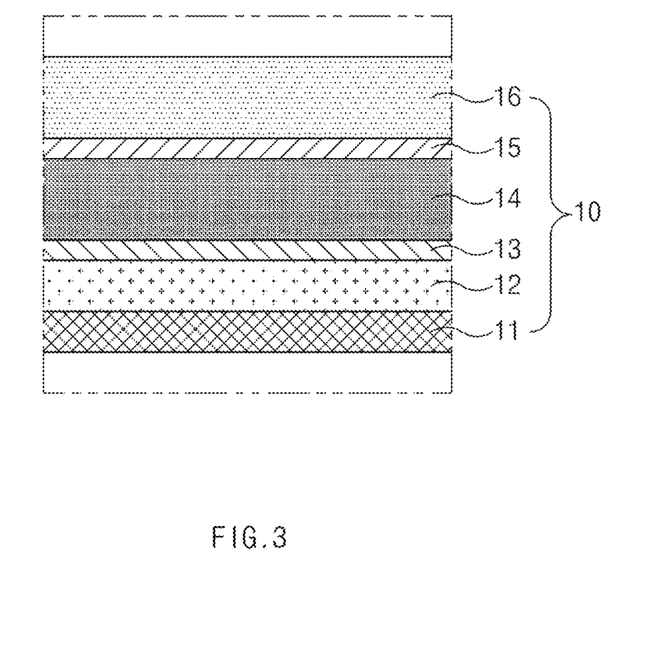
FIG. 3 is an enlarged cross-sectional view of an area B in FIG. 2.

FIG. 1 is a perspective view illustrating a curling process in a method for forming a pouch according to an embodiment of the present invention, FIG. 2 is a cross-sectional view taken along line A-A' of FIG. 1, and FIG. 3 is an enlarged cross-sectional view of an area B in FIG. 2.

Figure 4:
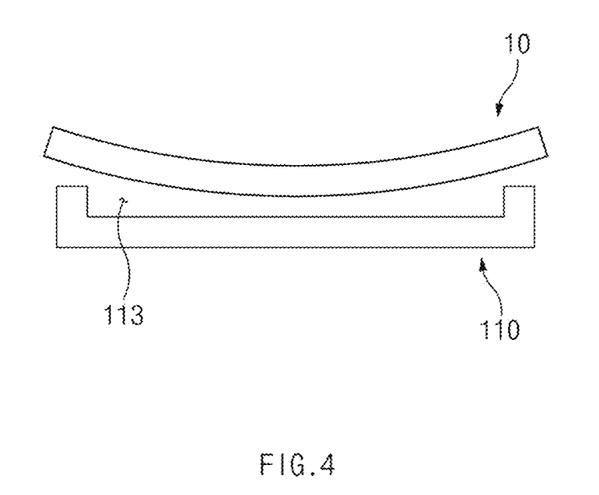
FIG. 4 is a cross-sectional view illustrating a seating process in the method for forming the pouch according to an embodiment of the present invention.
Figure 5:
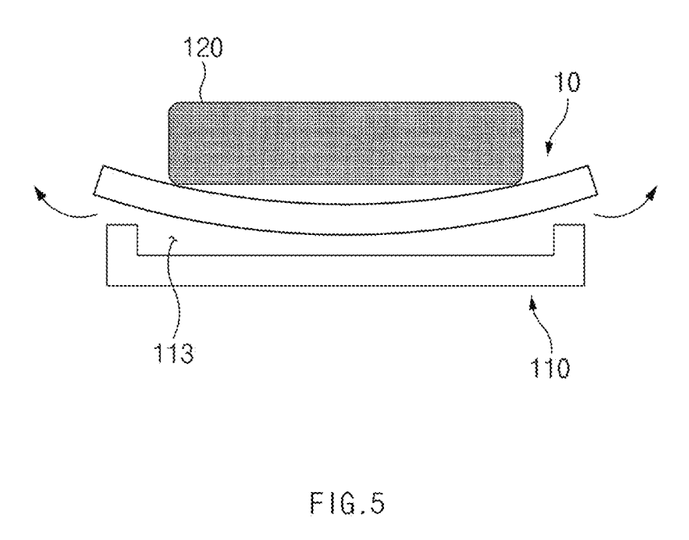
FIG. 5 is a cross-sectional view illustrating a state before pressing a pouch sheet in a forming process in the method for forming the pouch according to an embodiment of the present invention.
Figure 6:
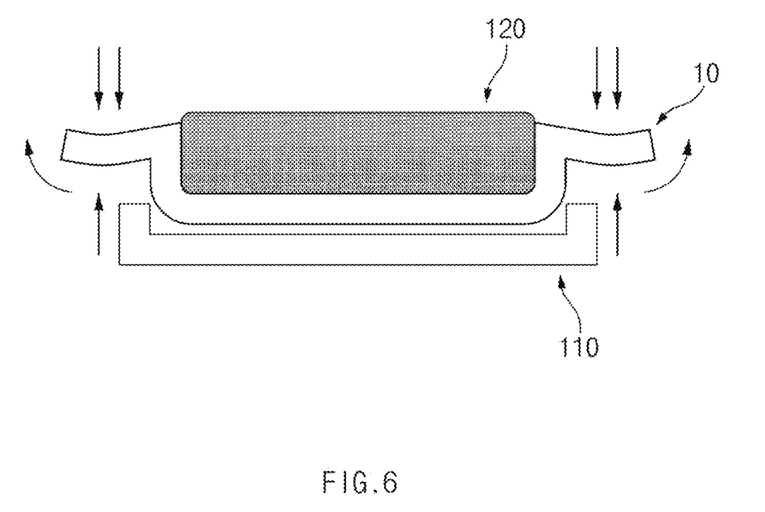
FIG. 6 is a cross-sectional view illustrating a state of pressing the pouch sheet in the forming process in the method for forming the pouch according to an embodiment of the present invention.

Also, FIG. 4 is a cross-sectional view illustrating a seating process in the method for forming the pouch according to an embodiment of the present invention, FIG. 5 is a cross-sectional view illustrating a state before pressing a pouch sheet in a forming process in the method for forming the pouch according to an embodiment of the present invention, and FIG. 6 is a cross-sectional view illustrating a state of pressing the pouch sheet in the forming process in the method for forming the pouch according to an embodiment of the present invention.

Referring to FIGS. 1 to 6, a method for forming a pouch according to an embodiment of the present invention may comprise a curling process of bending a pouch sheet 10, a seating process of seating the bent pouch sheet 10 on a lower mold 110, and a forming process of forming an accommodation part 10a in the pouch sheet 10 by using a punch mold 120.

Hereinafter, the method for forming the pouch according to an embodiment of the present invention will be described in more detail.

Referring to FIGS. 1 to 3, in the curling process, the pouch sheet 10 may be bent in a round shape. Here, in the curling process, the pouch sheet 10 may be bent to be convex downward. Here, in the curling process, the pouch sheet 10 may be bent in an arc shape. That is, in the curling process, when the pouch sheet 10 is seated on a lower mold 110, the pouch sheet 10 may be bent to form a convex curvature in a direction of the lower mold 110.

In the curling process, after lamination of the pouch sheet 10, a degree of crystallinity may be changed by controlling a cooling temperature to bend the pouch sheet 10.

The pouch sheet 10 may have, for example, a PP layer 16 provided thereon. Here, in the curling process, the pouch sheet 10 may be bent by applying tension to the PP layer.

In addition, referring to FIGS. 2 and 3, the pouch sheet 10 may have a structure, in which a PET layer 11, a nylon layer 12, an aluminum layer 14, and the PP layer 16 are stacked upward from a lower side. Here, the pouch sheet 10 may further comprise, for example, adhesion layers 13 and 15 on both surfaces of the aluminum layer 14 to firmly adhere between the nylon layer 12, the PET layer 11, and the aluminum layer 14.

In the curling process, after laminating the pouch sheet 10 by applying heat and a pressure, a cooling temperature may be controlled to change the degree of crystallinity of the PP layer 16, thereby applying tension to the PP layer 16. That is, in the curling process, after the PP layer 16 is extruded and attached to the aluminum layer 14, the PP layer 16 is cooled so that the tension is applied to the PP layer, and thus, the pouch sheet 10 may be bent.

Here, although the PP layer 16 is disposed in an upward direction in FIGS. 2 and 3, an inner layer of the pouch may be formed when the electrode assembly is accommodated.

The PP layer 16 may be made of a polypropylene (PP) material, and the nylon layer 12 may be made of a nylon material. In addition, the aluminum layer 14 may be provided as a sheet made of an aluminum (Al) material, and the PET layer 11 may be made of a polyethylene terephthalate material.

Referring to FIG. 4, in the seating process, the bent pouch sheet 10 may be seated on the lower mold 110 in which a molding groove 113 is formed.

In the seating process, the pouch sheet 10 may be seated so that the convex portion of the pouch sheet 10 faces the molding groove 113 of the lower mold 110.

Figure 7:
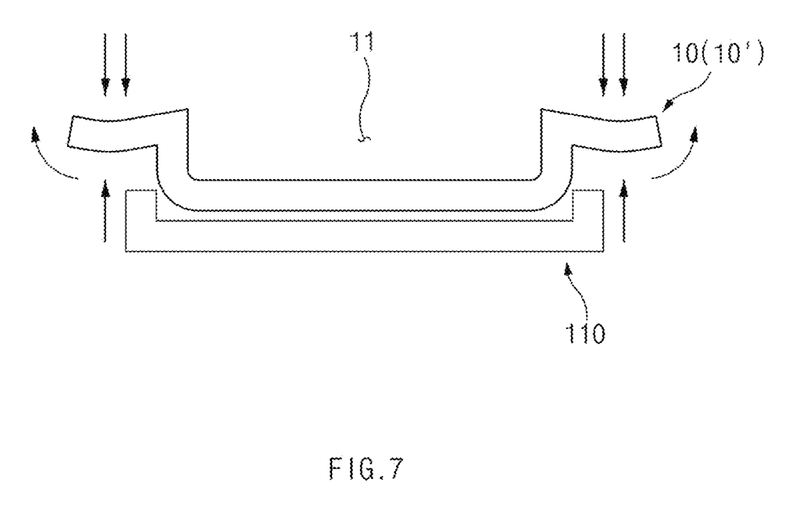
FIG. 7 is a cross-sectional view illustrating a state in which a punch mold is separated to form a pouch after pressing the pouch sheet in the forming process in the method for forming the pouch according to an embodiment of the present invention.

FIG. 7 is a cross-sectional view illustrating a state in which a punch mold is separated to form a pouch 10' after pressing the pouch sheet in the forming process in the method for forming the pouch according to an embodiment of the present invention.

Referring to FIGS. 5 to 7, in the forming process, the pouch sheet 10 may be pressed through the punch mold 120 to form the accommodation part 10a in which the electrode assembly is accommodated in the pouch sheet 10.

In the forming process, the pouch sheet 10 may be pressed from an upper side of the pouch sheet 10 in a direction of the lower mold 110 by using punch mold 120 to form the accommodation part 10a corresponding to the molding groove 113 of the lower mold 110, thereby manufacturing the pouch.

In the method for forming the pouch, which is configured as described above, according to the present invention, after the pouch sheet 10 is bent to be rounded in the direction of the molding groove 113 of the lower mold 110, the pouch sheet 10 may be pressed in the direction of the molding groove 113 of the lower mold 110 through the punch mold 120 to significantly prevent or reduce an occurrence of curls in the pouch.

Method for Forming Pouch According to Another Embodiment

Hereinafter, a method for forming a pouch according to another embodiment of the present invention will be described.

Figure 8:
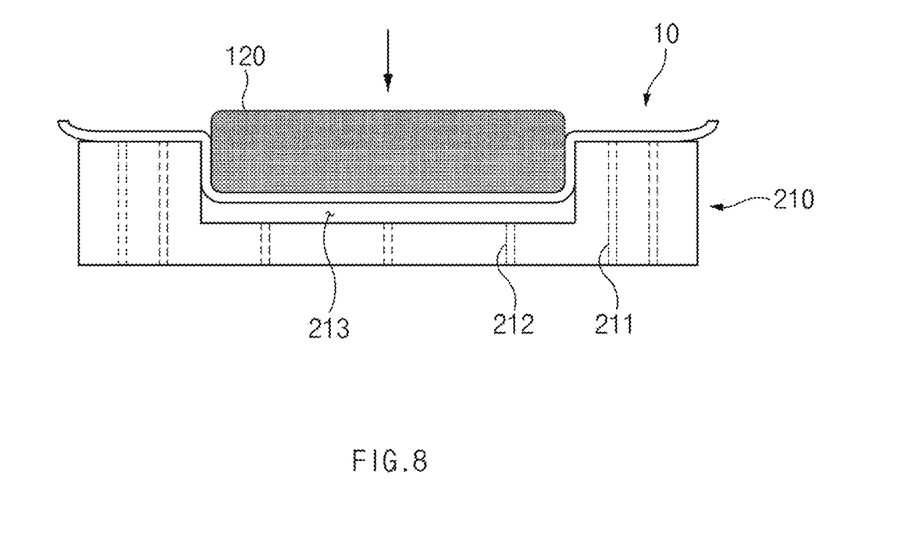
FIG. 8 is a cross-sectional view illustrating a vacuum adsorption process in a forming process in a method for forming a pouch according to another embodiment of the present invention.
Figure 9:
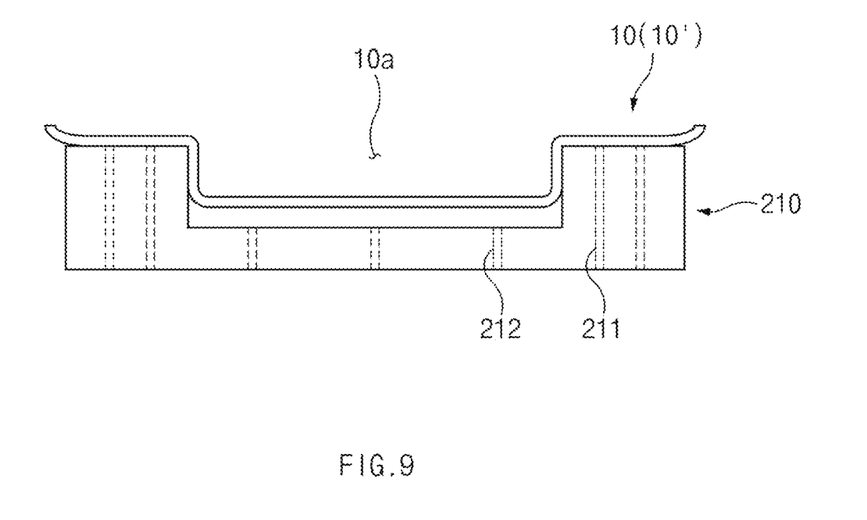
FIG. 9 is a cross-sectional view illustrating a state in which a punch mold is separated after pressing a pouch sheet in the forming process in the method for forming the pouch according to another embodiment of the present invention.

FIG. 8 is a cross-sectional view illustrating a vacuum adsorption process in a forming process in a method for forming a pouch according to another embodiment of the present invention, and FIG. 9 is a cross-sectional view illustrating a state in which a punch mold is separated after pressing a pouch sheet in the forming process in the method for forming the pouch according to another embodiment of the present invention.

Referring to FIGS. 8 to 9, in a method for forming a pouch according to another embodiment of the present invention, a method for forming a pouch according to an embodiment of the present invention may comprise a curling process of bending a pouch sheet 10, a seating process of seating the bent pouch sheet 10 on a lower mold 210, and a forming process of forming an accommodation part 10a in the pouch sheet 10 by using a punch mold 120. Here, the forming process may comprise a vacuum adsorption process of vacuum-suctioning the pouch sheet 10.

The method for forming the pouch according to another embodiment of the present invention is different from the method for forming the pouch according to the foregoing embodiment of the present invention in that the vacuum adsorption process is performed in the forming process. Thus, contents of this embodiment, which are duplicated with those according to the foregoing embodiment, will be omitted or briefly described, and also, differences therebetween will be mainly described.

In more detail, in the forming process in the method for forming the pouch according to another embodiment of the present invention, a pouch sheet 10 may be pressed through a punch mold 120 to form an accommodation part 10a in which an electrode assembly is accommodated in a pouch sheet 10.

In the forming process, the pouch sheet 10 may be pressed from an upper side of the pouch sheet 10 in a direction of a lower mold 210 by using punch mold 120 to form the accommodation part 10a corresponding to a molding groove 213 of the lower mold 210.

Here, the forming process may comprise a vacuum adsorption process of vacuum-suctioning the pouch sheet 10.

Here, in the vacuum adsorption process, in the forming process, when the pouch sheet 10 is pressed, the pouch sheet 10 may be vacuum-adsorbed through vacuum holes 211 and 212 formed in the lower mold 210.

Thus, when the pouch sheet 10 is pressed through the punch mold 120, movement of the pouch sheet 10 may be prevented.

The pouch according to an embodiment of the present invention may be manufactured through the method for forming the pouch according to the foregoing embodiment of the present invention or the method for forming the pouch according to the foregoing another embodiment of the present invention.

Figure 10:
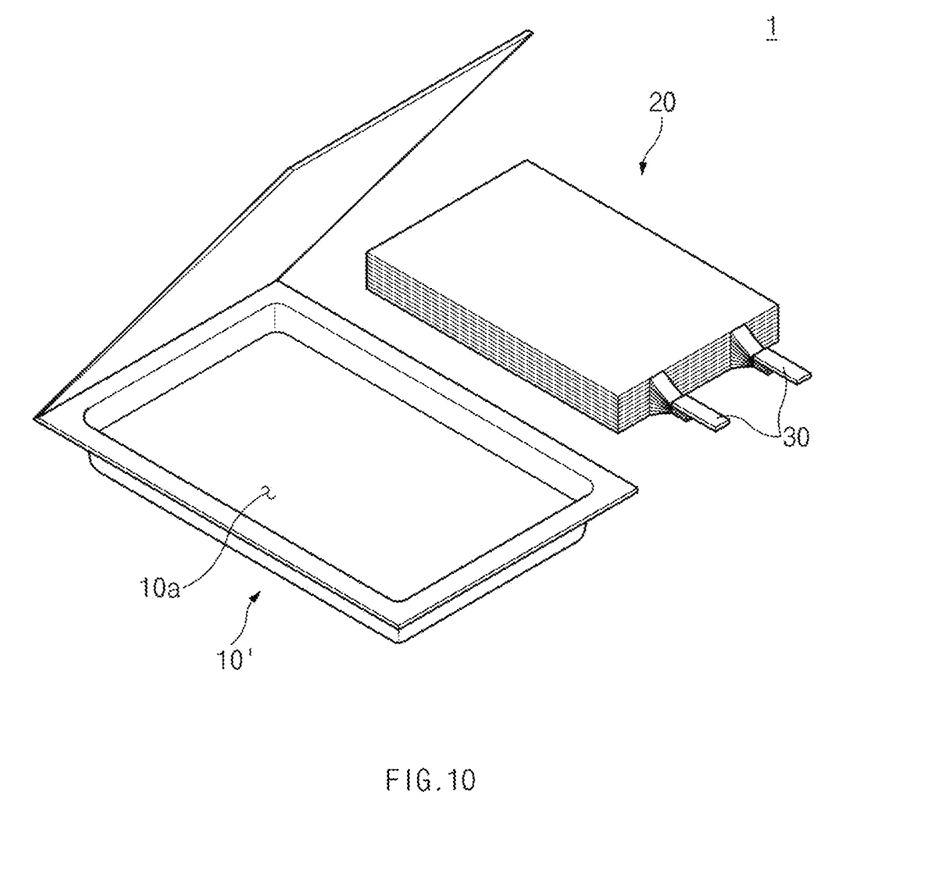
FIG. 10 is an exploded perspective view illustrating an example of a secondary battery comprising the pouch manufactured in the method for forming the pouch according to an embodiment of the present invention.

FIG. 10 is an exploded perspective view illustrating an example of a secondary battery comprising the pouch manufactured in the method for forming the pouch according to an embodiment of the present invention.

Referring to FIG. 10, a secondary battery 1 according to an embodiment of the present invention may include a pouch 10' manufactured through the method for forming the pouch according to the foregoing embodiment of the present invention or the method for forming the pouch according to the foregoing another embodiment of the present invention.

In more detail, the secondary battery 1 may comprise a pouch 10' and an electrode assembly 20 accommodated in an accommodation part 10a of the pouch 10'.

In addition, in the secondary battery 1, an electrode lead 30 may be provided at one side or each of both sides of the electrode assembly 20. Here, although the electrode lead 30 may be disposed in one direction of the electrode assembly 20 in FIG. 10, the electrode lead 30 may also be disposed on each of both the sides of the electrode assembly 20.

Experimental Example

Figure 11:
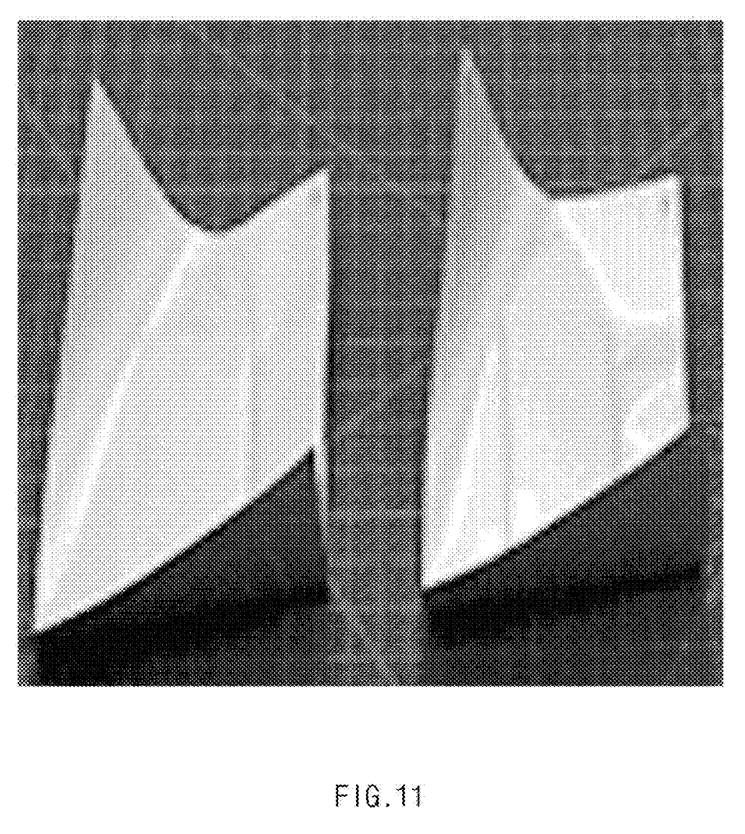
FIG. 11 is an image showing a pouch manufactured in a method for forming a pouch according to a related art.
Figure 12:
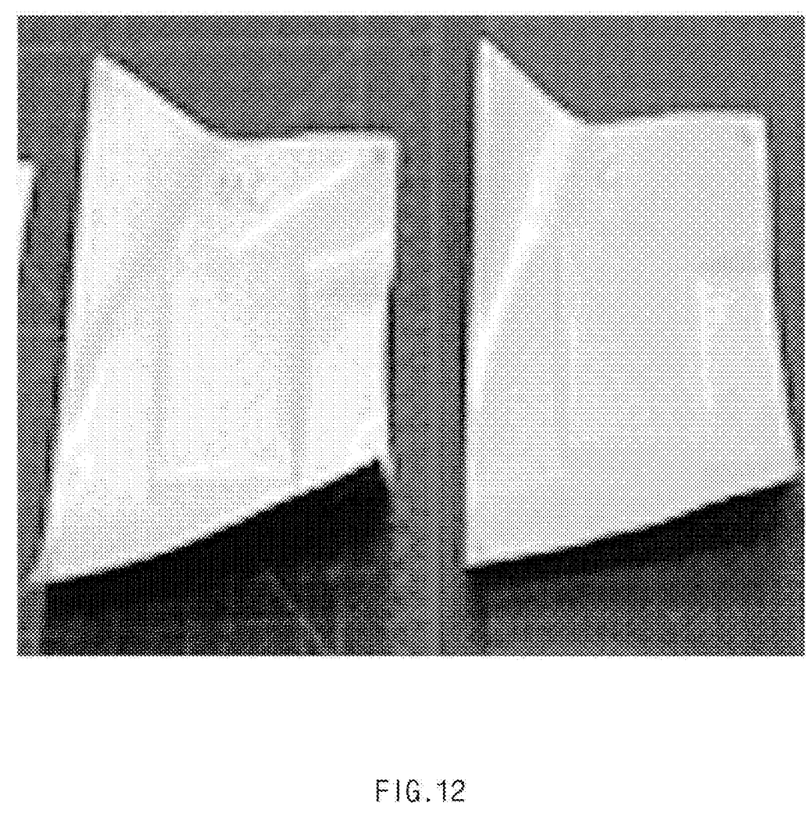
FIG. 12 is an image showing a pouch manufactured in a method for forming a pouch according to an embodiment of the present invention.

FIG. 11 is an image showing a pouch manufactured in a method for forming a pouch according to a related art, and FIG. 12 is an image showing a pouch manufactured in a method for forming a pouch according to an embodiment of the present invention.

Here, FIG. 11 is an image showing a pouch manufactured through a method for forming a pouch according to the related art, in which a forming process is performed in a flat shape without bending a pouch sheet, and FIG. 12 is an image showing a pouch manufactured through a method for forming a pouch according to an embodiment of the present invention, in which a forming process is performed after a pouch sheet is bent to be rounded in a direction of a molding groove of a lower mold.

An amount of curling in each of the pouches manufactured according to the present invention and the related art, which are illustrated in FIGS. 11 and 12, was measured to be shown in Table 1 below. In Table 1, Product 1 and Product 2 in the pouch according to the related art are shown in left and right images of FIG. 11, and Product 3 and Product 4 in the pouch according to the present invention are shown in left and right images of FIG. 12.

TABLE 1

| | | Amount of curling (mm) | | | |
|---|---|---|---|---|---|
| Classification | | Upper left | Lower left | Upper right | Lower right |
| Pouch of related art | Product 1 | 40 | 21.5 | 14 | 39.5 |
| | Product 2 | 45 | 23 | 11.5 | 41 |
| Pouch of present invention | Product 3 | 26 | 12 | 5 | 27 |
| | Product 4 | 24 | 9 | 6.5 | 22 |

As shown in Table 1 above, the amount of curling in the pouch manufactured through the method for forming the pouch according to an embodiment of the present invention has a mean value of 25 mm at the upper left position and a mean value of 5.75 mm at the lower right position. On the other hand, the amount of curling in the pouch manufactured through the method for forming the pouch according to the related art has a mean value of 42.5 mm at the upper left position and a mean value of 12.75 mm at the lower right position, which are indicated as significantly increasing values. Thus, in the pouch manufactured through the method for forming the pouch according to an embodiment of the present invention, it is seen that the forming process is performed after the pouch sheet is bent to be rounded in the direction of the molding groove of the lower mold to significantly reduce the amount of curling.

While the present invention has been particularly shown and described with reference to the specific embodiments, it is to be understood that the scope of the present invention is not limited to the method for forming the pouch according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

1: Secondary battery
10: Pouch sheet

10*a*: Accommodation part
20: Electrode assembly
30: Electrode lead
110, 210: Lower mold
113, 213: Molding groove
120: Punch mold
211, 212: Vacuum hole

The invention claimed is:

1. A method for forming a pouch, the method comprising:
bending a pouch sheet into a rounded shape;
seating the pouch sheet on a lower mold, the lower mold having a molding groove formed therein; and
pressing the pouch sheet using a punch mold to form an accommodation part, the accommodation part being configured to receive an electrode assembly therein,
wherein during the seating, the pouch sheet is seated so that a portion of the pouch sheet having the rounded shape extends into the molding groove of the lower mold,
wherein the pouch sheet has a polypropylene layer thereon, and during the bending, tension is applied to the polypropylene layer to bend the pouch sheet, and wherein during the bending, the polypropylene layer is cooled to apply the tension to the polypropylene layer.

2. The method for forming a pouch of claim 1, wherein during the bending, the pouch sheet is bent in a convex shape.

3. The method for forming a pouch of claim 2, wherein during the bending, the pouch sheet is bent in an arc shape.

4. The method for forming a pouch of claim 1, wherein the pouch sheet is formed by stacking a PET layer, a nylon layer, an aluminum layer, and the polypropylene layer upward from the PET layer.

5. The method for forming a pouch of claim 1, wherein during the pressing, the pouch sheet is pressed by the punch mold against an upper side of the pouch sheet in a direction toward the lower mold to form the accommodation part, the accommodation part having a shape that is complementary to the molding groove of the lower mold.

6. The method for forming a pouch of claim 1, wherein the pressing comprises vacuum-adsorbing the pouch sheet against the lower mold through a vacuum hole formed in the lower mold while the pouch sheet is pressed.

\* \* \* \* \*